(12) United States Patent
Zhang et al.

(10) Patent No.: US 12,539,523 B2
(45) Date of Patent: Feb. 3, 2026

(54) AEROSOL-GENERATING DEVICE

(71) Applicant: Shenzhen Moore Vaporization Health & Medical Technology Co., Ltd., Guangdong (CN)

(72) Inventors: Xie'en Zhang, Shenzhen (CN); Xitian Xie, Shenzhen (CN); Sheng Yang, Shenzhen (CN)

(73) Assignee: Shenzhen Moore Vaporization Health & Medical Technology Co., Ltd., Shenzhen (CN)

( * ) Notice: Subject to any disclaimer, the term of this patent is extended or adjusted under 35 U.S.C. 154(b) by 609 days.

(21) Appl. No.: 17/929,119

(22) Filed: Sep. 1, 2022

(65) Prior Publication Data

US 2023/0084119 A1    Mar. 16, 2023

(30) Foreign Application Priority Data

Sep. 10, 2021   (CN) ......................... 202111063731.7

(51) Int. Cl.
  *B05B 17/06*     (2006.01)
  *A24F 40/05*    (2020.01)
  (Continued)

(52) U.S. Cl.
  CPC .......... *B05B 17/0653* (2013.01); *A24F 40/05* (2020.01); *A24F 40/10* (2020.01);
  (Continued)

(58) Field of Classification Search
  CPC .. B05B 5/00–1691; B05B 17/06–0676; B05B 17/0646; B05B 5/0531;
  (Continued)

(56) References Cited

U.S. PATENT DOCUMENTS

| | | |
|---|---|---|
| 2004/0195403 A1 | 10/2004 | Atterbury et al. |
| 2009/0027829 A1 | 1/2009 | Nozu et al. |
| 2016/0338407 A1 | 11/2016 | Kerdemelidis |

FOREIGN PATENT DOCUMENTS

| | | |
|---|---|---|
| CN | 1440329 A | 9/2003 |
| CN | 103769319 A | 5/2014 |

(Continued)

OTHER PUBLICATIONS

European Patent Office, Search Report in European Patent Application No. 22194989.4 (Feb. 17, 2023).

(Continued)

*Primary Examiner* — Arthur O. Hall
*Assistant Examiner* — Juan C Barrera
(74) *Attorney, Agent, or Firm* — Leydig, Voit & Mayer, Ltd.

(57) ABSTRACT

An aerosol-generating device includes: a housing having a liquid storage cavity for accommodating an aerosol-generating substrate; a metal element arranged outside the liquid storage cavity; a static electricity generating assembly including a positive terminal and a negative terminal, one of the positive terminal and the negative terminal being electrically connected to the metal element so as to cause a part of the aerosol-generating substrate that is close to the metal element in the liquid storage cavity to be charged by electrostatic induction when the static electricity generating assembly is electrified; and a vaporization sheet, that, when electrified, vaporizes the charged aerosol-generating substrate to generate a charged aerosol.

8 Claims, 12 Drawing Sheets

(51) Int. Cl.
  *A24F 40/10*   (2020.01)
  *A24F 40/42*   (2020.01)
  *A24F 40/485*  (2020.01)
  *H02M 3/24*    (2006.01)

(52) U.S. Cl.
  CPC ............ *A24F 40/42* (2020.01); *A24F 40/485* (2020.01); *B05B 17/0676* (2013.01); *H02M 3/24* (2013.01)

(58) Field of Classification Search
  CPC ... B05B 17/0607; B05B 5/0533; B05B 5/043; B05B 5/025; B05B 5/03; B05B 5/007; B05B 5/0536; A24F 40/485; A24F 40/10; A24F 40/05; A24F 40/42; A24F 40/00–95; H02M 3/24; B65D 83/384; B65D 83/388; B65D 83/75; B65D 83/753; A61M 11/005; A61M 15/0085; A61M 2205/8206; A61M 15/0021; A61M 2205/0294; A61M 15/06; A61M 15/00; A61M 15/001
  USPC ............................................ 239/102.1, 102.2
  See application file for complete search history.

(56) References Cited

FOREIGN PATENT DOCUMENTS

| | | | | |
|---|---|---|---|---|
| CN | 105244304 | A | | 1/2016 |
| CN | 105852226 | A | | 8/2016 |
| CN | 108447700 | A | | 8/2018 |
| CN | 109730367 | A | | 5/2019 |
| CN | 209219265 | U | | 8/2019 |
| CN | 111343876 | A | | 6/2020 |
| CN | 210933210 | U | | 7/2020 |
| CN | 112386784 | A | | 2/2021 |
| CN | 212911666 | U | | 4/2021 |
| CN | 113171898 | A * | 7/2021 ............... A61L 9/14 |
| JP | 09502647 | A | | 3/1997 |
| JP | 2003125694 | A | | 5/2003 |
| JP | 2005270669 | A | | 10/2005 |
| JP | 2006205094 | A | | 8/2006 |
| JP | 2006247454 | A | | 9/2006 |
| JP | 200754810 | A | | 3/2007 |
| JP | 2007521950 | A | | 8/2007 |
| JP | 2008167981 | A | | 7/2008 |
| JP | 2008168223 | A | | 7/2008 |
| JP | 200982186 | A | | 4/2009 |
| JP | 201099640 | A | | 5/2010 |
| JP | 2010167418 | A | | 8/2010 |
| JP | 2010240188 | A | | 10/2010 |
| JP | 201222200 | A | | 2/2012 |
| JP | 201229754 | A | | 2/2012 |
| JP | 201812068 | A | | 1/2018 |
| JP | 201879401 | A | | 5/2018 |
| JP | 6667710 | B1 | | 3/2020 |
| KR | 101218748 | B1 | | 1/2013 |
| KR | 1020130059430 | A | | 6/2013 |
| KR | 1020150035238 | A | | 4/2015 |
| WO | 2019105812 | A1 | | 6/2019 |
| WO | 2021028217 | A1 | | 2/2021 |

OTHER PUBLICATIONS

Patent Cooperation Treaty, International Search Report, International Application No. PCT/CN2021/117792 (Jun. 16, 2022).
Patent Cooperation Treaty, Written Opinion of the International Searching Authority, International Application No. PCT/CN2021/117792 (Jun. 16, 2022).
Chinese Patent Office, Notification of grant of patent right for invention in Chinese Patent Application No. 202111063709.2 (Aug. 22, 2024).
Chinese Patent Office, Notification of grant of patent right for invention in Chinese Patent Application No. 202111063731.7 (Aug. 23, 2024).
Japanese Patent Office, Decision to Grant a Patent in Japanese Patent Application No. 2022-137079 (May 30, 2023).
Korean Patent Office, Office Action in Korean Patent Application No. 10-2022-0110833 (Jul. 15, 2023).
Chinese Patent Office, Office Action in Chinese Patent Application No. 202111063731.7 (Apr. 29, 2024).
Chinese Patent Office, Office Action in Chinese Patent Application No. 202111063709.2 (Apr. 28, 2024).
Korean Patent Office, Decision to Grant a Patent in Korean Patent Application No. 10-2022-0110833 (May 30, 2023).

\* cited by examiner

AEROSOL-GENERATING DEVICE

CROSS-REFERENCE TO PRIOR APPLICATION

Priority is claimed to Chinese Patent Application No. 202111063731.7, filed on Sep. 10, 2021, the entire disclosure of which is hereby incorporated by reference herein.

FIELD

The present invention relates to the field of electronic vaporization technologies, and in particular, to an aerosol-generating device.

BACKGROUND

Aerosol-generating devices have attracted more and more attention and favor from the public because of their advantages such as safety, convenience, health, and environmental protection. The aerosol-generating devices are widely used in fields such as medical vaporization and cosmetic vaporization.

Currently, deposition amount of an aerosol on a surface of a target object is an important performance indicator. When conventional vaporized aerosol particles are deposited on the surface of the target object, there is a relatively serious phenomenon in which vaporized aerosol particles rebound and drift, resulting in a relatively low deposition rate of the aerosol and low effective utilization.

SUMMARY

In an embodiment, the present invention provides an aerosol-generating device, comprising: a housing comprising a liquid storage cavity configured to accommodate an aerosol-generating substrate; a metal element arranged outside the liquid storage cavity; a static electricity generating assembly comprising a positive terminal and a negative terminal, one of the positive terminal and the negative terminal being electrically connected to the metal element so as to cause a part of the aerosol-generating substrate that is close to the metal element in the liquid storage cavity to be charged by electrostatic induction when the static electricity generating assembly is electrified; and a vaporization sheet, that, when electrified, is configured to vaporize the charged aerosol-generating substrate to generate a charged aerosol.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 7 is a schematic diagram of a circuit of an aerosol-generating device corresponding to FIG. 6a;

FIG. 8b is a schematic diagram of a circuit of an aerosol-generating device corresponding to FIG. 8a;

FIG. 9 is a schematic diagram of a circuit of an aerosol-generating device according to an embodiment of this application;

DETAILED DESCRIPTION

Figure 1:
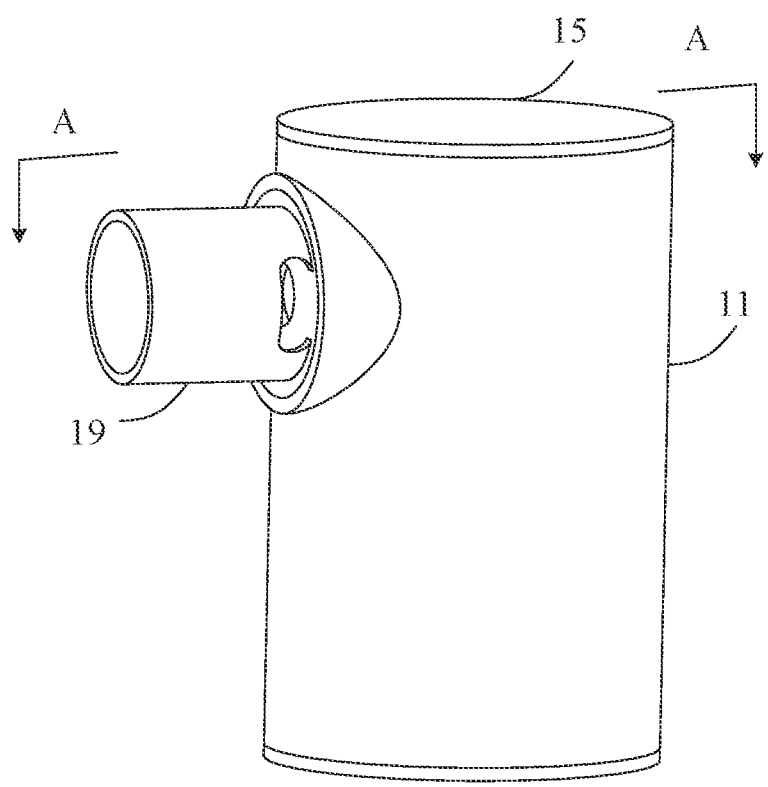
FIG. 1 is a schematic diagram of an overall structure of an aerosol-generating device according to an embodiment of this application.

In an embodiment, the present invention provides an aerosol-generating device. The aerosol-generating device can resolve the problems of a low deposition rate and low effective utilization of the existing aerosol on a surface of a target object.

In an embodiment, the present invention provides an aerosol-generating device. The aerosol-generating device includes: a housing, a metal element, and a static electricity generating assembly. The housing includes a liquid storage cavity, where the liquid storage cavity is configured to accommodate an aerosol-generating substrate. The metal element is arranged outside the liquid storage cavity. The static electricity generating assembly includes a positive terminal and a negative terminal, where one of the positive terminal and the negative terminal is electrically connected to the metal element to cause a part of the aerosol-generating substrate that is close to the metal element in the liquid storage cavity to be charged by electrostatic induction when the static electricity generating assembly is electrified; and a vaporization sheet, when electrified, is configured to vaporize the charged aerosol-generating substrate to generate a charged aerosol.

The positive terminal is electrically connected to the metal element.

The aerosol-generating device further includes a conductive terminal, where a first end of the conductive terminal extends into the liquid storage cavity, and a second end of the conductive terminal that is opposite to the first end is exposed to atmosphere.

The aerosol-generating device further includes a charge collector, where the charge collector is insulated from the metal element, and the second end of the conductive terminal is electrically connected to the charge collector.

The housing further includes an accommodating cavity; and the charge collector is a metal layer that is arranged on an inner surface of the accommodating cavity or a metal part that is fixed on the inner surface of the accommodating cavity.

The aerosol-generating device further includes a conductive protrusion, where the conductive protrusion is arranged on the inner surface of the accommodating cavity and is electrically connected to the charge collector; and the conductive terminal is electrically connected to the conductive protrusion.

At least a part of a side wall of the housing is made of metal, and the side wall of the housing that is made of metal is also served as at least a part of the charge collector.

The liquid storage cavity includes a liquid outlet; and the metal element is arranged surrounding the liquid outlet, and is located between the vaporization sheet and the liquid storage cavity.

The metal element is in a shape of a closed ring, and the closed-ring-shaped metal element is arranged in a circumferential direction of the liquid outlet.

The static electricity generating assembly further includes a voltage converter, the voltage converter includes a primary side and a secondary side, the positive terminal is electrically connected to the primary side, the negative terminal is electrically connected to the secondary side, and the primary side is electrically connected to or insulated from the secondary side.

In the aerosol-generating device provided in this application, a housing provided with a liquid storage cavity is arranged, so as to accommodate an aerosol-generating substrate in the liquid storage cavity. In addition, a metal element and a static electricity generating assembly are provided, and the metal element is arranged outside the liquid storage cavity. The static electricity generating assembly includes a positive terminal and a negative terminal, where one of the positive terminal and the negative terminal is electrically connected to the metal element to cause a part of the aerosol-generating substrate that is close to the metal element in the liquid storage cavity to be charged by electrostatic induction when the static electricity generating assembly is electrified. In addition, a vaporization sheet is arranged, so as to vaporize the charged aerosol-generating substrate when the vaporization sheet is electrified to generate a charged aerosol, such that the charged aerosol particles can be effectively adsorbed on a surface of a target object by electrostatic adsorption, thereby greatly rebounding and drifting of the aerosol on the surface of the target object, and greatly improving the deposition rate of the aerosol particles on the surface of the target object.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In this application, the terms "first", "second" and "third" are used merely for the purpose of description, and shall not be construed as indicating or implying relative importance or implying a quantity of indicated technical features. Therefore, features defining "first" "second" and "third" can explicitly or implicitly include at least one of the features. In description of this application, "more" means at least two, such as two and three unless it is specifically defined otherwise. All directional indications (for example, up, down, left, right, front, back) in the embodiments of this application are only used for explaining relative position relationships, movement situations or the like between the various components in a specific posture (as shown in the accompanying drawings). If the specific posture changes, the directional indications change accordingly. In addition, the terms "include", "have", and any variant thereof are intended to cover a non-exclusive inclusion. For example, a process, method, system, product, or device that includes a series of steps or units is not limited to the listed steps or units; and instead, further optionally includes a step or unit that is not listed, or further optionally includes another step or unit that is intrinsic to the process, method, product, or device.

"Embodiment" mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

This application is described in detail below with reference to the accompanying drawings and embodiments.

Figure 2:
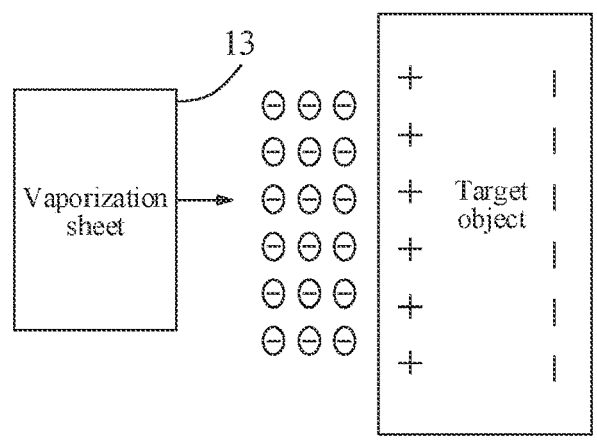
FIG. 2 is a schematic diagram of a principle of improving a deposition rate of an aerosol by electrostatic adsorption.

FIG. 1 is a schematic diagram of an overall structure of an aerosol-generating device according to an embodiment of this application; and FIG. 2 is a schematic diagram of a principle of improving a deposition rate of an aerosol by electrostatic adsorption. In this embodiment, an aerosol-generating device is provided. The aerosol-generating device, when electrified, can charge an aerosol-generating substrate, and vaporize the charged aerosol-generating substrate to form a charged aerosol. As shown in FIG. 2, when the charged aerosol is close to a surface of a target object (such as a human body), heterogeneous charges are induced on the surface of the target object. The charged aerosol (such as droplets) is adsorbed by the surface of the target object due to the attraction of heterogeneous charges, so that the charged aerosol is deposited on the surface of the target object by electrostatic adsorption. As a result, the deposition rate of the aerosol on the surface of the target object is improved to improve the utilization of the aerosol and reduce the probability of rebounding and drifting of the aerosol on the surface of the target object. The aerosol-generating substrate may be liquid medicine, a plant grass-like substrate, or a paste-like substrate. The aerosol-generating device can be used in different fields, such as medical vaporization, cosmetic or electronic vaporization, or the like.

Figure 3:
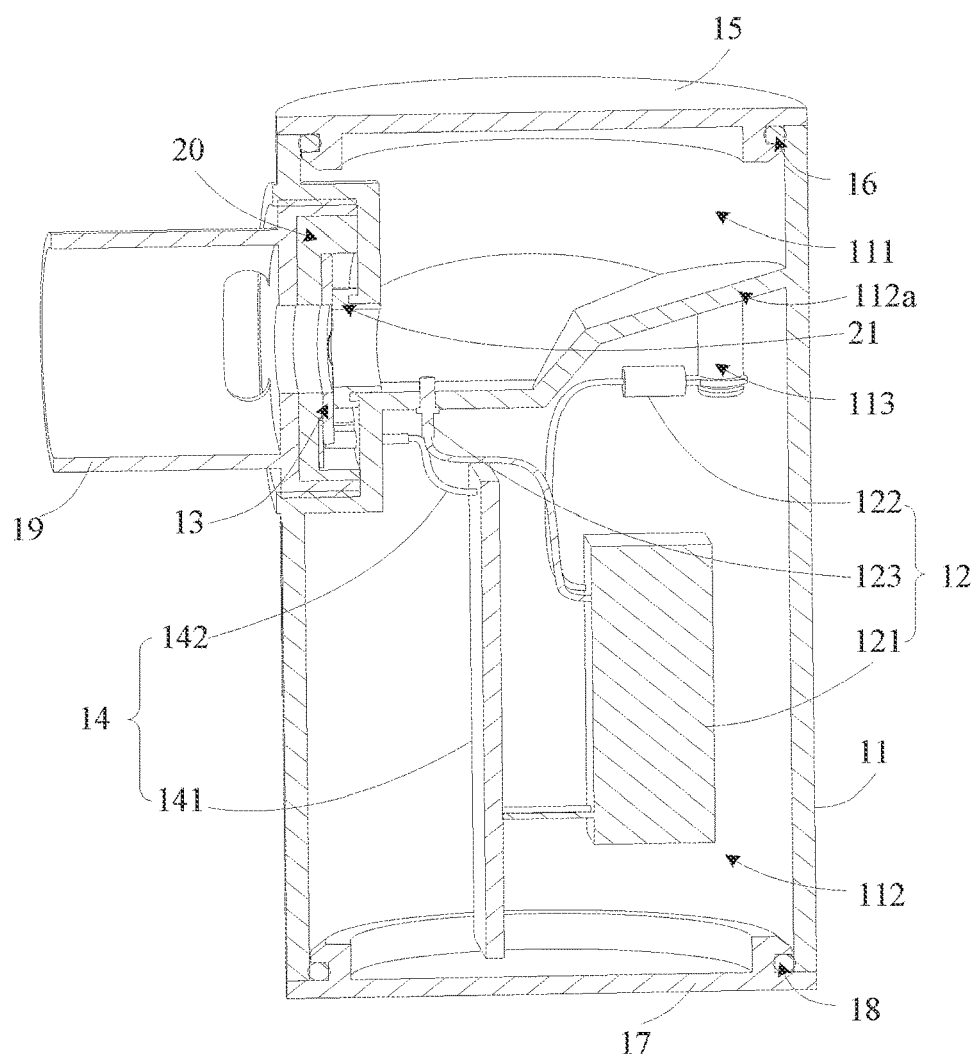
FIG. 3 is a cross-sectional view of the aerosol-generating device shown in FIG. 1 along an A-A direction according to a first embodiment.

FIG. 3 is a cross-sectional view of the aerosol-generating device shown in FIG. 1 along an A-A direction according to a first embodiment. In this embodiment, the aerosol-generating device includes a housing 11, a static electricity generating assembly 12, a vaporization sheet 13, a power supply assembly 14, a first cover body 15, a first sealing member 16, a second cover body 17, and a second sealing member 18.

Figure 4:
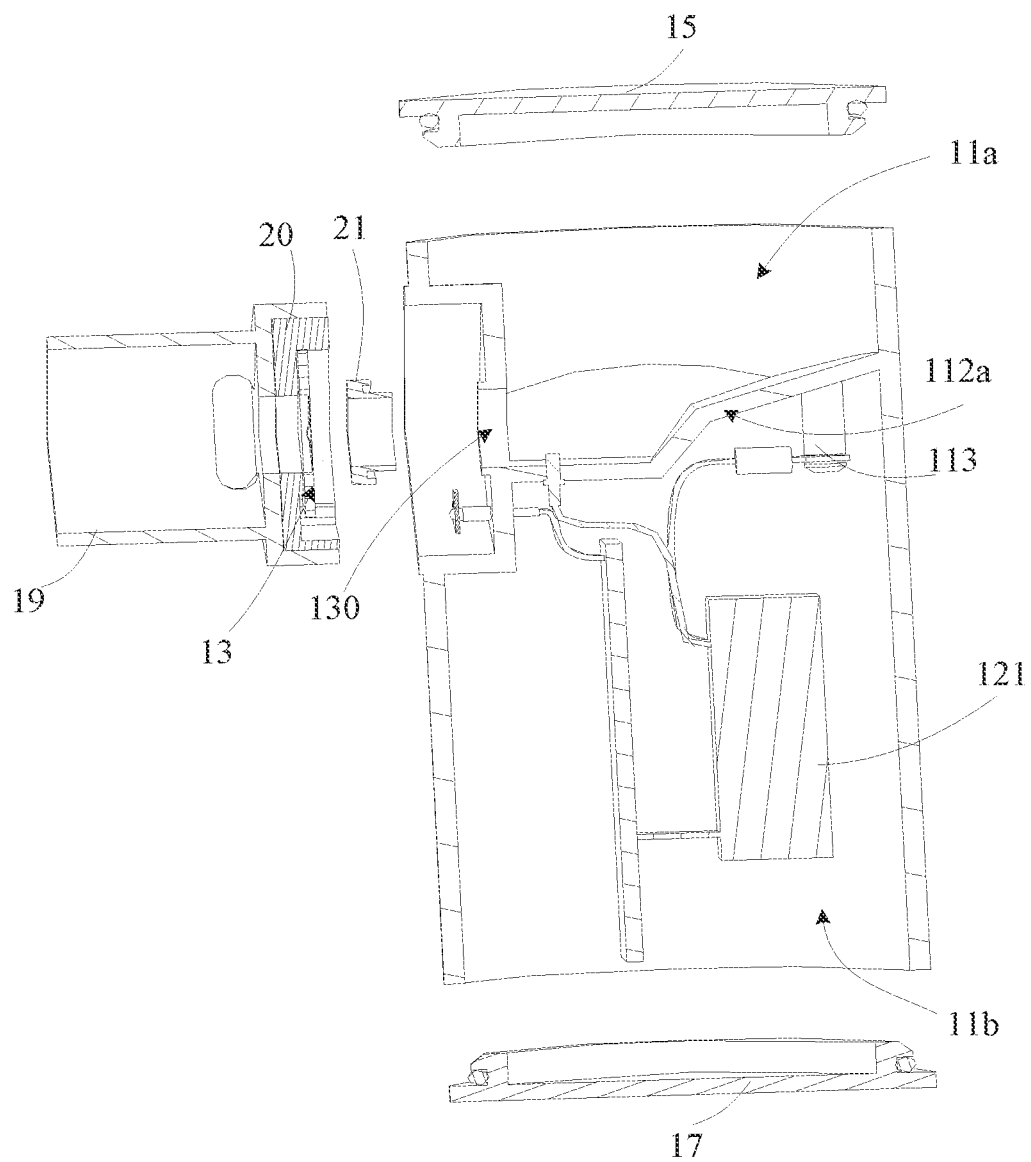
FIG. 4 is a schematic disassembly diagram of FIG. 3 according to an embodiment of this application.

Referring to FIG. 4, FIG. 4 is a schematic disassembly diagram of FIG. 3 according to an embodiment of this application. The housing 11 includes a first groove body 11a and a second groove body 11b, and a first cover body 15 covers an opening of the first groove body 11a, so as to cooperate with the first groove body 11a to form a liquid storage cavity 111. The first sealing member 16 is embedded at a joint between the first cover body 15 and the first groove body 11a to seal the liquid storage cavity 111. The liquid storage cavity 111 is configured to accommodate an aerosol-generating substrate. The liquid storage cavity 111 includes a liquid outlet 130, and the aerosol-generating substrate in the liquid storage cavity 111 flows out to the vaporization sheet 13 through the liquid outlet 130, so that the aerosol-generating substrate flowing out of the liquid storage cavity 111 is vaporized by the vaporization sheet 13 when the vaporization sheet 13 is electrified. It can be understood that the vaporization sheet 13 is located outside the liquid storage cavity 111 and is in fluid communication with the liquid storage cavity 111.

The second cover body 17 covers an opening of the second groove body 11b, and cooperates with the second groove body 11b to form an accommodating cavity 112. The second sealing member 18 is embedded at a joint between the second cover body 17 and the second groove body 11b to seal the accommodating cavity 112. The accommodating cavity 112 specifically includes a top wall, a bottom wall, and an annular side wall that is connected to the top wall and the bottom wall. The top wall of the accommodating cavity 112 and at least a part of the bottom wall of the liquid storage cavity 111 are the same cavity wall to be served as the first cavity wall 112a; and the second cover body 17 is served as the bottom wall of the accommodating cavity 112. In a specific embodiment, the housing 11 includes a cylindrical annular side wall and an isolation panel that is arranged within the cylindrical annular side wall. The isolation panel divides an inner space of the cylindrical annular side wall into a first groove body 11a and a second groove body 11b. The isolation panel is served as a common bottom wall of the first groove body 11a and the second groove body 11b, that is, the first cavity wall 112a of the accommodating cavity 112 and the liquid storage cavity 111.

The static electricity generating assembly 12 is accommodated in the accommodating cavity 112, and the static electricity generating assembly 12 can specifically be a high-voltage static electricity generator. The static electricity generating assembly 12 includes a voltage converter 121 and a positive terminal 122 and a negative terminal 123 that are connected to the voltage converter 121.

Specifically, as shown in FIG. 3 and FIG. 4, the negative terminal 123 of the static electricity generating assembly 12 extends into the liquid storage cavity 111 to cause the aerosol-generating substrate in the liquid storage cavity 111 to be negatively charged when the static electricity generating assembly 12 is electrified. In this embodiment, after the negative terminal 123 comes into contact with the aerosol-generating substrate, the aerosol-generating substrate is negatively charged. After the aerosol-generating substrate is vaporized by the vaporization sheet 13, negatively charged vaporization particles are sprayed out and deposited on a surface of a target object by electrostatic adsorption. It can be understood that, in an alternative embodiment, the positive terminal 122 of the static electricity generating assembly 12 can also extend into the liquid storage cavity 111 to cause the aerosol-generating substrate to be positively charged.

In the following, the upper part of the direction shown in FIG. 1 is defined as a top portion of the aerosol-generating device, and the lower part of the direction shown in FIG. 1 is defined as a bottom portion of the aerosol-generating device. In this embodiment, the negative terminal 123 can be arranged at a bottom portion of the liquid storage cavity 111, so that the aerosol-generating substrate in the liquid storage cavity 111 can be kept in contact with the negative terminal 123 in a process in which the aerosol-generating substrate in the liquid storage cavity 111 gradually reduces, thereby ensuring that the sprayed aerosol is continuously charged.

Further, as shown in FIG. 3, the liquid outlet 130 is opened on a side wall of the liquid storage cavity 111, and the negative terminal 123 is arranged at the bottom portion of the liquid storage cavity 111, where a linear distance between the negative terminal 123 and the liquid outlet 130 is much less than a distance between the negative terminal 123 and an other end of the liquid storage cavity 111, where the other end specifically refers to an end of the liquid storage cavity 111 that is opposite to the liquid outlet 130. In this way, a large quantity of negative charges can be accumulated at the liquid outlet 130 of the liquid storage cavity 111, so that a large amount of negatively charged aerosol is formed by vaporization of the vaporization sheet 13.

In this embodiment the vaporization sheet 13 is arranged on the liquid outlet 130, and can be specifically located on a side of the liquid outlet 130 that is away from the liquid storage cavity 111. In a specific embodiment, the vaporization sheet 13 includes a piezoelectric ceramic piece and a microporous steel film that is attached to the piezoelectric ceramic piece. After the piezoelectric ceramic piece is electrified, the piezoelectric ceramic piece is excited by an electrical signal to generate a high frequency resonance. Energy of the oscillation causes the microporous steel film attached to the piezoelectric ceramic piece to produce ultrasonic oscillation, and causes the charged aerosol-generating substrate absorbed on the microporous steel film to produce ultrasonic oscillation, so that the charged aerosol-generating substrate is dispersed to generate natural and elegant vapor. The vaporization sheet 13 does not need to be heated or added with any chemical reagent. Compared with a manner of heating the vaporized aerosol-generating substrate, 90% of energy is saved.

The power supply assembly 14 is accommodated in the accommodating cavity 112 and is electrically connected to the static electricity generating assembly 12 and the vaporization sheet 13 for supplying power to the static electricity generating assembly 12 and the vaporization sheet 13. The power supply assembly 14 can include a power supply, a circuit board 141, and a power supply electrode 142 that is connected to the circuit board 141. The power supply electrode 142 can be a metal wire. The power supply is connected to the circuit board 141. The static electricity generating assembly 12 is connected to the circuit board 141. The vaporization sheet 13 is connected to the circuit board 141 through the power supply electrode 142. The power supply respectively supplies power to the static electricity generating assembly 12 and the vaporization sheet 13 through the circuit board 141. The power supply can specifically be a lithium-ion battery.

In a specific embodiment, the aerosol-generating device further includes a suction nozzle 19, a third sealing member 20, and a fourth sealing member 21. The suction nozzle 19 is detachably connected to the housing 11. The suction nozzle 19 is provided with a snap-in slot; the third sealing member 20 is embedded in the snap-in slot and matches a shape of the snap-in slot; and the vaporization sheet 13 is embedded on a side, which is away from the snap-in slot, of the third sealing member 20 and abuts against the vaporization sheet 13. In a specific embodiment, specifically, the charged aerosol formed through vaporization by the vaporization sheet 13 is sprayed out of the aerosol-generating device through the suction nozzle 19. It can be understood that after the suction nozzle 19 and the housing 11 are mounted, the third sealing member 20 wraps the vaporization sheet 13 and the liquid outlet 130. In this way, the aerosol generated by vaporization can be effectively prevented from leaking from a gap between the suction nozzle 19 and the housing 11. The fourth sealing member 21 is arranged at a contact position between the liquid outlet 130 and the vaporization sheet 13 to prevent the aerosol-generating substrate from leaking from a gap between the liquid outlet 130 and the vaporization sheet 13.

The first sealing member 16, the second sealing member 18, the third sealing member 20, and the fourth sealing member 21 can be sealing rings, such as silicone rings or rubber rings.

In the aerosol-generating device provided in this embodiment, the housing 11 and the static electricity generating assembly 12 are arranged. The static electricity generating assembly 12 includes a positive terminal 122 and a negative terminal 123. One of the positive terminal 122 and the negative terminal 123 extends into the liquid storage cavity 111 of the housing 11, so that the aerosol-generating substrate in the liquid storage cavity 111 is charged through a terminal that extends into the liquid storage cavity 111 when the static electricity generating assembly 12 is electrified. In addition, a vaporization sheet 13 is arranged, so as to vaporize the charged aerosol-generating substrate when the vaporization sheet 13 is electrified, to generate a charged aerosol. As a result, the charged aerosol particles can be effectively adsorbed on a surface of a target object, thereby greatly reducing rebounding and drifting of the aerosol on the surface of the target object, and greatly improving the deposition rate of the aerosol particles on the surface of the target object.

In this embodiment, as shown in FIG. 3, the positive terminal 122 of the static electricity generating assembly 12 is suspended. In this embodiment, a connecting post 113 can be arranged on an inner surface of the accommodating cavity 112, and the positive terminal 122 can be fixed on the connecting post 113 to implement suspension arrangement relative to the accommodating cavity 112. In this embodiment, the connecting post 113 can be made of an insulating material. Certainly, the connecting post 113 can also be made of a conductive material, such as copper or aluminum.

Figure 5:
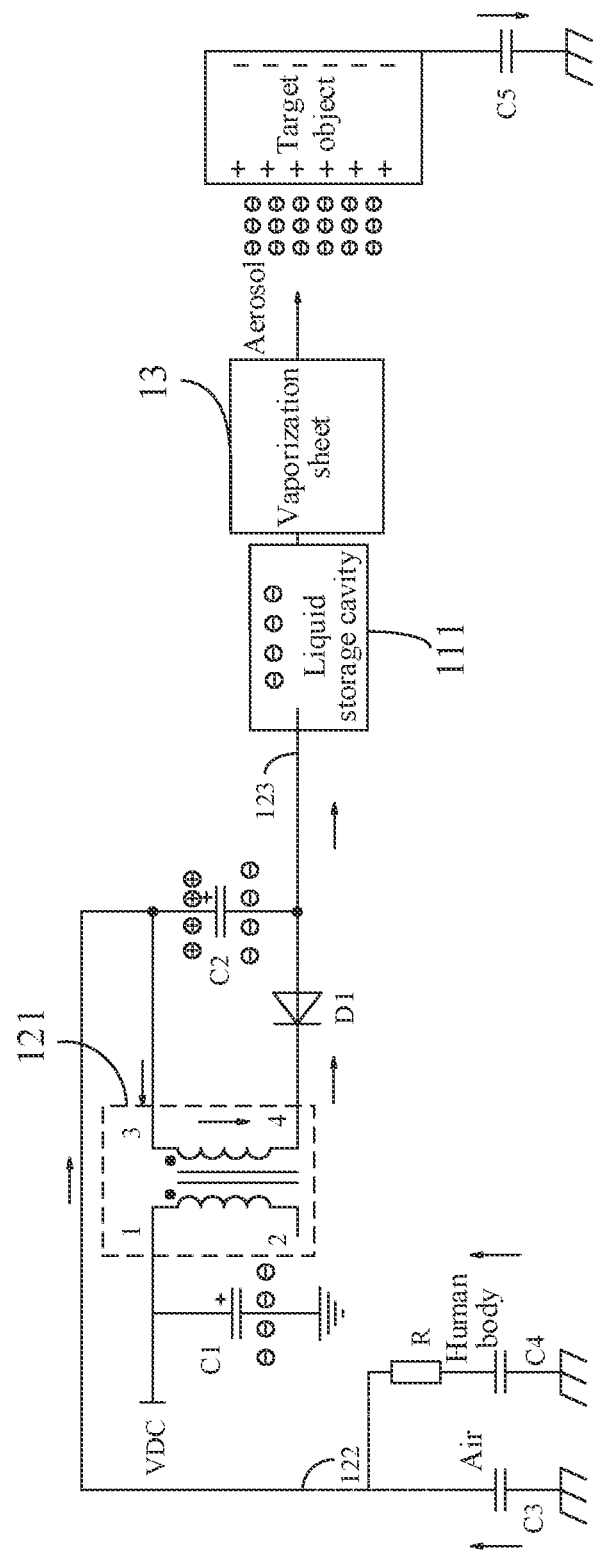
FIG. 5 is a circuit principle analysis diagram of an aerosol-generating device corresponding to FIG. 3.

In this embodiment, FIG. 5 is a circuit principle analysis diagram of an aerosol-generating device corresponding to FIG. 3. The static electricity generating assembly 12 includes a voltage converter 121, a first capacitor C1, a second capacitor C2, and a diode D1. A first end of a primary side of the voltage converter 121 is connected to a power supply voltage VDC, and is further connected to a ground voltage through the first capacitor C1. A third end of a secondary side of the voltage converter 121 is connected to the positive terminal 122 of the static electricity generating assembly 12. A fourth end of the secondary side of the voltage converter 121 is connected to a negative electrode of the diode D1. A positive electrode of the diode D1 is connected to the negative terminal 123 of the static electricity generating assembly 12. The negative terminal 123 of the static electricity generating assembly 12 is inserted into the liquid storage cavity 111 to come into contact with liquid in the liquid storage cavity 111. The positive terminal 122 of the static electricity generating assembly 12 is suspended, and is connected to the negative terminal 123 through the second capacitor C2.

Because the positive terminal 122 of the static electricity generating assembly 12 is suspended, the suspended positive terminal 122 can be electrically connected to the ground through the air (corresponding to a virtual capacitor C3), or electrically connected to the ground through a human body (corresponding to a virtual capacitor C4) that is in contact with the housing 11 (corresponding to a virtual resistor R) of the aerosol-generating device, or both the electrical connection paths may exist. In this case, negative charges (electrons) can reach the positive terminal 122 of the static electricity generating assembly 12 through the air and/or the human body (the virtual capacitor C3 or the virtual capacitor C4) from the ground. Then, the negative charges (electrons) reach the negative terminal 123 of the static electricity generating assembly 12 through the secondary side of the static electricity generating assembly 12 and the inverted diode D1. Then, the negative charges (electrons) sequentially return to the ground through the negative terminal 123, the aerosol-generating substrate in the liquid storage cavity 111, the aerosol vaporized by the vaporization sheet 13, and the target object. The target object can be electrically connected to the ground through the air (corresponding to a virtual capacitor C5). Therefore, a flow path of charges forms a loop.

Specifically, in this embodiment, the insulating arrangement of the primary side and the secondary side of the voltage converter 121 can ensure the safety of using the aerosol-generating device.

Figure 6A:
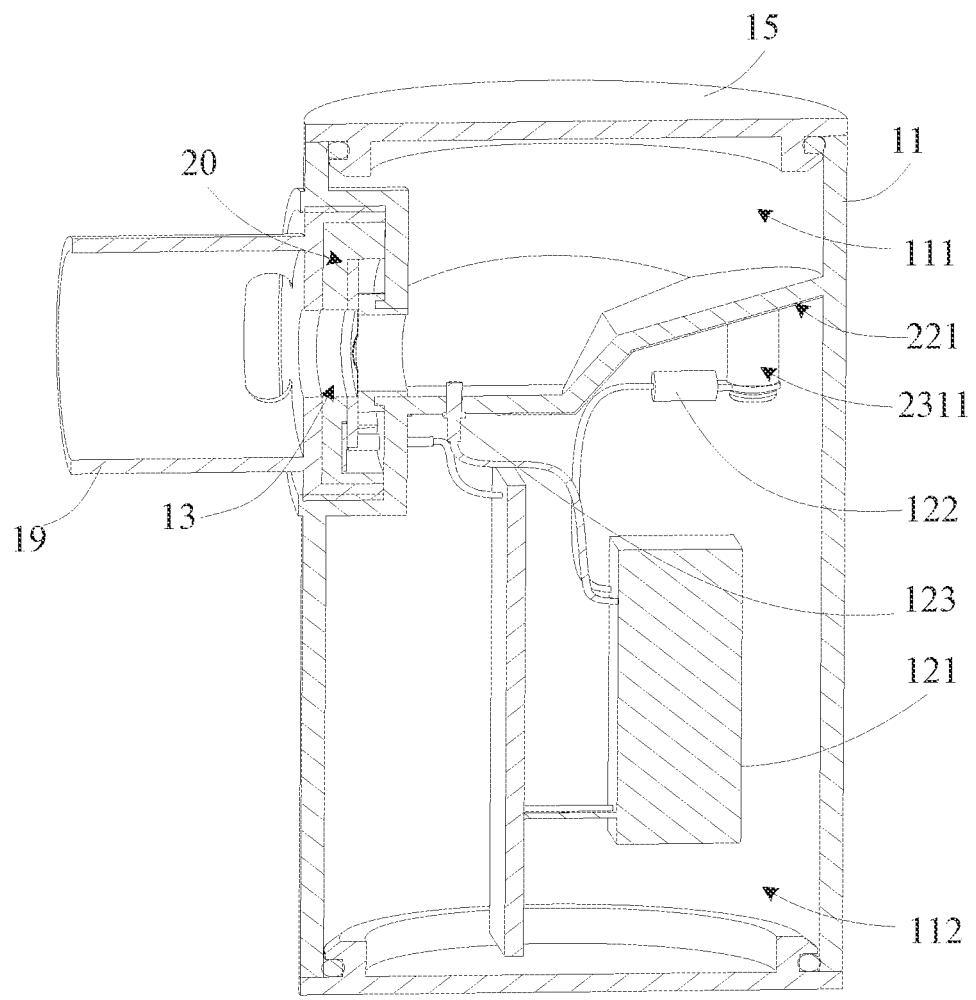
FIG. 6a is a cross-sectional view of the aerosol-generating device shown in FIG. 1 along an A-A direction according to a second embodiment.
Figure 6B:
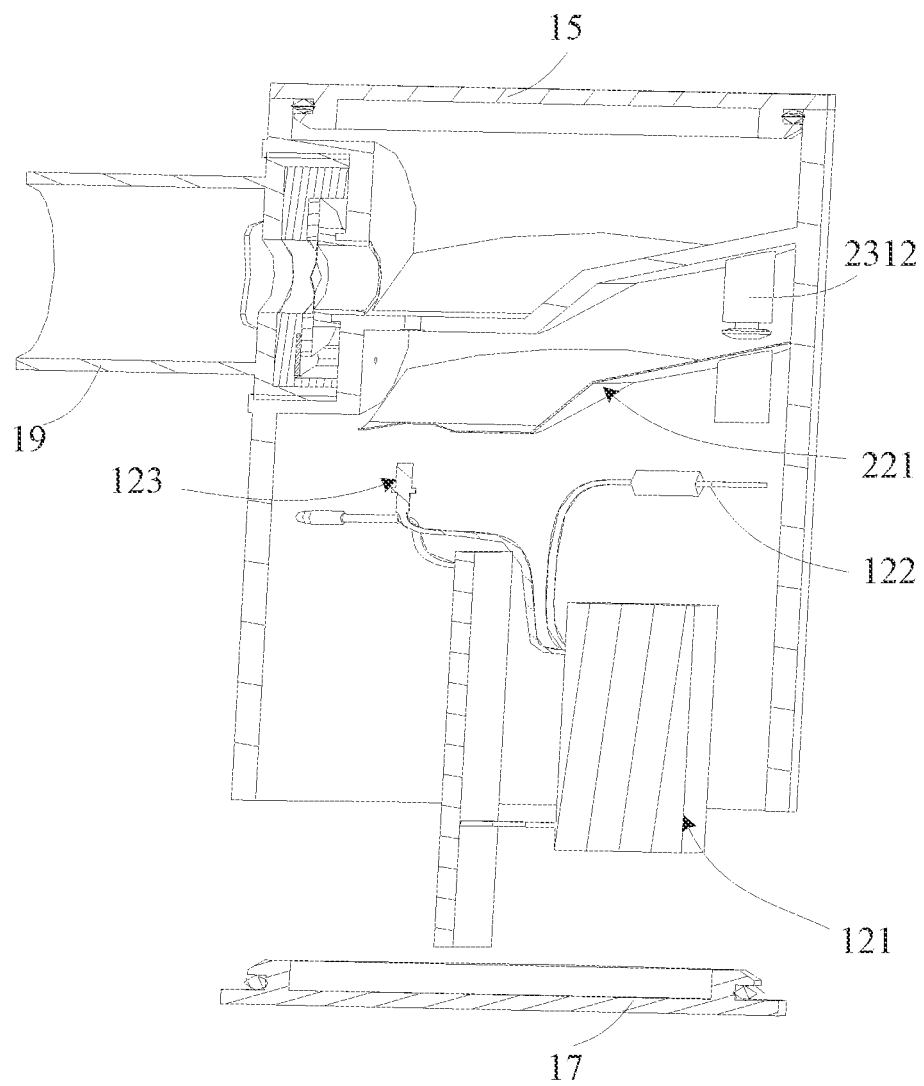
FIG. 6b is a schematic disassembly diagram of FIG. 6a according to an embodiment of this application.

Because the positive terminal 122 of the static electricity generating assembly 12 is suspended, impedance is relatively large. According to formula (1): I=V/R, where I is a current value; V is a voltage value; and R is an impedance value of the positive terminal 122 to the air. It can be learned that the impedance is relatively high, and the I value is relatively small at the same voltage, and a charge amount carried by the aerosol is relatively small, which is not conducive to the deposition of the aerosol. Therefore, to increase the deposition rate of the aerosol, the I value needs to be increased to cause the aerosol to carry more negative charges. In this case, the static electricity generating assembly 12 needs to output a higher voltage value (in KV). For the aerosol-generating substrate in the liquid storage cavity 111, according to formula (2): Q=CV, where Q is a charge amount; C is a capacitance value; and V is a voltage value. To increase the charge amount of the aerosol-generating substrate, on the one hand, a voltage value outputted by the static electricity generating assembly 12 can be increased; and on the other hand, a capacitance value can be increased. Preferably, in this application, the charge amount carried by the aerosol-generating substrate can be increased by increasing the capacitance value. In this way, the danger caused by high voltage is avoided, so that user safety is improved In view of this, in another embodiment, as shown in FIG. 6a and FIG. 6b, FIG. 6a is a cross-sectional view of the aerosol-generating device shown in FIG. 1 along an A-A direction according to a second embodiment; FIG. 6b is a schematic disassembly diagram of FIG. 6a according to an embodiment of this application. The aerosol-generating device further includes a charge collector 221. The positive terminal 122 is specifically electrically connected to the charge collector 221 to increase a contact area between the positive electrode and the air. As a result, more charges in the air are received, to receive a large quantity of negative charges in the air and continuously accumulate the negative charges in the high-voltage static electricity negative terminal 123.

Figure 7:
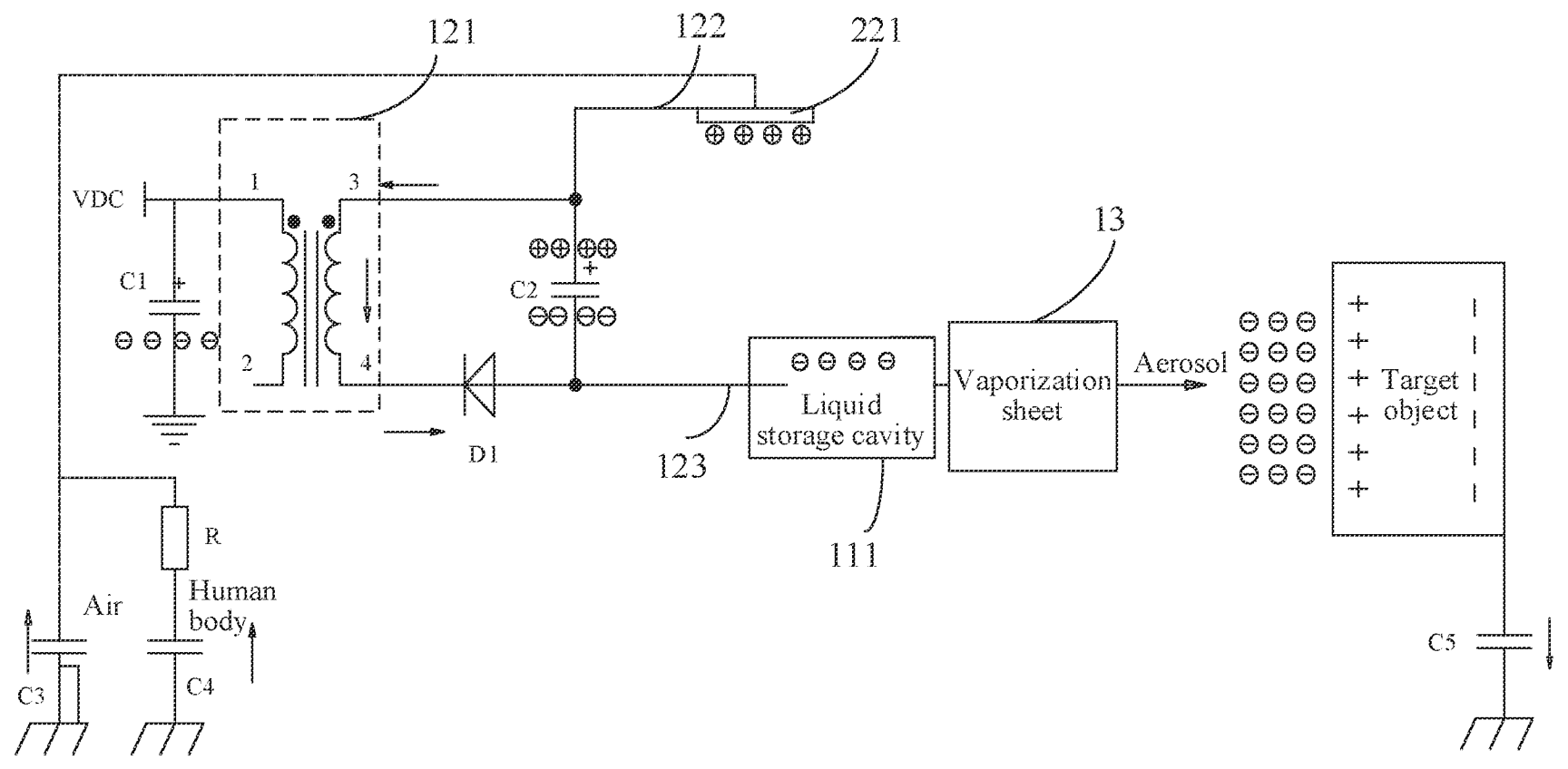

In this embodiment, FIG. 7 is a schematic diagram of a circuit of an aerosol-generating device corresponding to FIG. 6a. Different from the circuit structure in FIG. 5, the positive terminal 122 of the static electricity generating assembly 12 is electrically connected to the charge collector 221.

The charge collector 221 is insulated from the negative terminal 123. Specifically, the charge collector 221 can be spaced apart from the negative terminal 123 to avoid a short circuit. It may be understood that in this embodiment, the negative terminal 123 is electrically conducive to the aerosol-generating substrate, the aerosol-generating substrate is equivalent to a negative electrode, the charge collector 221 is electrically conducive to the positive terminal 122, the charge collector 221 is equivalent to the positive electrode, and the charge collector 221 cooperates with the charged aerosol-generating substrate to form an equivalent capacitor.

In this embodiment, the charge collector 221 is specifically arranged in the accommodating cavity 112, and the charge collector 221 is arranged on an inner surface of the accommodating cavity 112. Certainly, in other embodiments, the charge collector 221 can also be arranged on an outer surface of the accommodating cavity 112 and/or a liquid storage cavity 111, and an operator can directly touch the charge collector 221. Alternatively, the charge collectors 221 can also be arranged on both an inner surface of the accommodating cavity 112 and an outer surface of the housing 11, and the inner surface of the accommodating cavity 112 is electrically connected to the charge collector 221 on the outer surface of the housing 11. Specifically, at least a part of the side wall of the housing 11 that corresponds to the charge collector 221 can be made of a conductive material, such as copper or aluminum, so that the charge collectors 221 on the inner surface and the outer surface are in communication with each other. Alternatively, a via hole may be opened on the housing 11, so that the charge collectors 221 on the inner surface and the outer surface of the housing 11 are in communication with each other through the via hole. This is not limited in this application.

According to formula (3): $C=\epsilon S/d$, where C is a capacitance value; $\epsilon$ is a dielectric constant of a material; S is a face-to-face area of two electrode plates; and D is a relative distance between the electrode plates. It can be learned that when the dielectric constant of the material is increased, the face-to-face area of the two electrode plates is increased, and the relative distance between the electrode plates is reduced, the capacitance value can be increased. Therefore, in this application, the charge collector 221 is used as the positive electrode, which is equivalent to increasing the face-to-face area of the two electrode plates. Further, in this embodiment, at least the inner surface of the accommodating cavity 112 that corresponds to the charge collector 221 can be suntextured and frosted to be in a concave-convex shape, so that the inner surface of the accommodating cavity 112 forms a rough surface structure to increase a surface area of the charge collector 221, thereby effectively increasing the capacitance value and increasing the charge amount carried by the aerosol-generating substrate.

Further, the dielectric constant of the material of at least a part of the side wall of the accommodating cavity 112 that is covered by the charge collector 221 can range from 1.5 to 5.2. For example, the dielectric constant of the material of at least a part of the side wall of the accommodating cavity 112 that is covered by the charge collector 221 can specifically be no less than 2, to increase the capacitance value by increasing the dielectric constant of the material, thereby increasing the charge amount carried by the aerosol-generating substrate.

In this embodiment, as shown in FIG. 6b, the charge collector 221 is specifically arranged on an inner surface of a first cavity wall 112a of the accommodating cavity 112. That is, a bottom wall of the charge collector 221 that is arranged in the liquid storage cavity 111 is exposed to an outer wall surface of a portion of the accommodating cavity 112. Specifically, the charge collector 221 can entirely cover an outer wall surface of the bottom wall of the liquid storage cavity 111 that is exposed to a portion of the accommodating cavity 112 to increase the contact area with the air.

In a specific embodiment, the charge collector 221 can be a metal layer that is formed on the outer surface of the bottom wall of the liquid storage cavity 111, and the positive terminal 122 is specifically electrically connected to the metal layer. Specifically, the metal layer can be formed on the bottom wall of the liquid storage cavity 111 by a manner such as electroplating or coating. The metal layer can be made of gold, silver, nickel, or the like. In this embodiment, to increase the surface area of the metal layer, at least the outer surface, which corresponds to the metal layer, of the bottom wall of the liquid storage cavity 111 is in a concave-convex shape.

In another specific embodiment, the charge collector 221 can be a metal part, for example, a sheet metal part. The metal part can be specifically adhered to the outer wall surface of the bottom wall of the liquid storage cavity 111 by an adhesive, such as a conductive epoxy resin or a conductive adhesive, and the positive terminal 122 is specifically electrically connected to and conductive to the metal part. The metal part can be made of metal such as copper, aluminum, or the like. A shape of the metal part can be matched with a shape of the bottom wall of the liquid storage cavity 111.

In a specific embodiment, a surface of the metal part that is in contact with the liquid storage cavity 111 can be sandblasted, so that a surface of the metal part that faces the accommodating cavity 112 is in a concave-convex shape to increase the surface area of the charge collector 221, thereby effectively increasing a capacitance value of an equivalent capacitor and increasing the charge amount carried by the aerosol-generating substrate. Certainly, in this embodiment, the inner surface of the accommodating cavity 112 can also be flat, and the inner surface of the accommodating cavity 112 is not limited in this embodiment. Specifically, a protective film can be formed on the surface of the metal part that is away from the accommodating cavity 112 by a manner such as coating or electroplating, to improve the capability of the sheet metal part to resist corrosion and oxidation. The protective film can be made of gold, silver, nickel, or the like.

In this embodiment, as shown in FIG. 6a and FIG. 6b, the aerosol-generating device further includes a conductive protrusion 2311. The conductive protrusion 2311 is arranged on the inner surface of the accommodating cavity 112 and is electrically connected to the charge collector 221 on the inner surface. The positive terminal 122 is specifically electrically connected to the conductive protrusion 2311, and is further electrically connected to the charge collector 222. As shown in FIG. 6b, an insulating protrusion 2312 is specifically formed on the bottom wall of the liquid storage cavity 111, and the bottom wall of the liquid storage cavity 111 and the insulating protrusion 2312 are both coated with a metal layer, thereby forming a charge collector 222 and a conductive protrusion 2311 respectively. In this embodiment, FIG. 8 is a cross-sectional view of the aerosol-generating device shown in FIG. 1 along an A-A direction according to a third embodiment. This embodiment is different from the aerosol-generating device of a first embodiment shown in FIG. 3 and FIG. 4 in that the aerosol-generating device can further include a metal element 24. The metal element 24 is arranged outside the liquid storage cavity 111 and is electrically connected to the positive terminal 1221. When the static electricity generating assembly 12 is electrified, the metal element 24 is positively charged to cause the aerosol-generating substrate that is close to the metal element 24 to induce a heterogeneous charge, that is, a negative charge, due to migration of electrons (identical charges repel each other, and heterogeneous charges attract each other), so that the negative charges carried by a part of the aerosol-generating substrate that is close to the metal element 24 in the liquid storage cavity 111 are further increased. It can be understood that, in an alternative embodiment, the metal element 24 is specifically connected to the negative terminal 122 when the positive terminal 122 extends into the liquid storage cavity 111. The metal element 24 is specifically arranged in the liquid outlet 130 of the liquid storage cavity 111.

In this way, the aerosol-generating substrate that is close to the liquid outlet 130 in the liquid storage cavity 111 can induce a large quantity of charges by electrostatic induction in a concentrated manner, thereby further increasing the charge amount in the aerosol-generating substrate. Specifically, the metal element 24 is arranged surrounding the liquid outlet 130 of the liquid storage cavity 111, and specifically can be in a shape of a closed ring and be located between the vaporization sheet 13 and the liquid storage cavity 111.

Specifically, the metal element 24 can be made of copper, aluminum, a copper-aluminum alloy, or the like.

In this embodiment, as shown in FIG. 8, different from the aerosol-generating device of a first embodiment shown in FIG. 3 and FIG. 4, the aerosol-generating device provided in this embodiment further includes a charge collector 222. Specifically, the charge collector 222 is arranged on an annular side wall of the accommodating cavity 112, and the charge collector 222 can specifically be arranged on an inner surface of the annular side wall of the accommodating cavity 112 to receive more negative charges from the air. It can be understood that, the charge collector 222 can specifically be arranged on an outer surface of the annular side wall of the accommodating cavity 112. Further, the charge collector 222 can also be arranged on the entire outer surface of the housing 11, and is not limited to the outer surface of the annular side wall of the accommodating cavity 112.

Certainly, in other embodiments, to increase the surface area of the charge collectors 222, the charge collectors 222 can also be simultaneously arranged on the inner surface of the first cavity wall 112a and the inner surface of the annular side wall. For example, the outer surface of the bottom wall of the liquid storage cavity 111 and the inner surface of the annular side wall of the accommodating cavity 112 form an interconnected metal layer, and the positive terminal 122 is specifically connected to the interconnected metal layer.

It can be understood that, the charge collector 222 is arranged. Because the charge collector 222 is electrically connected to the metal element 24, the charges induced by the metal element 24 can be further increased, so that the deposition rate of the aerosol is further increased.

Figure 8A:
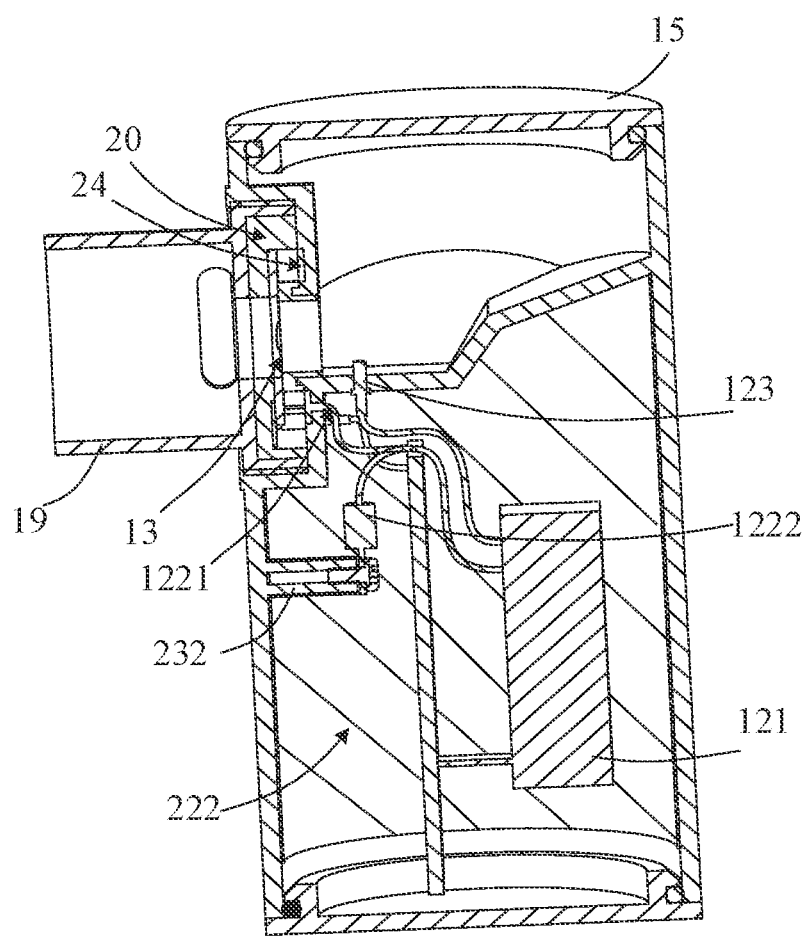
FIG. 8a is a cross-sectional view of the aerosol-generating device shown in FIG. 1 along an A-A direction according to a third embodiment.
Figure 8B:
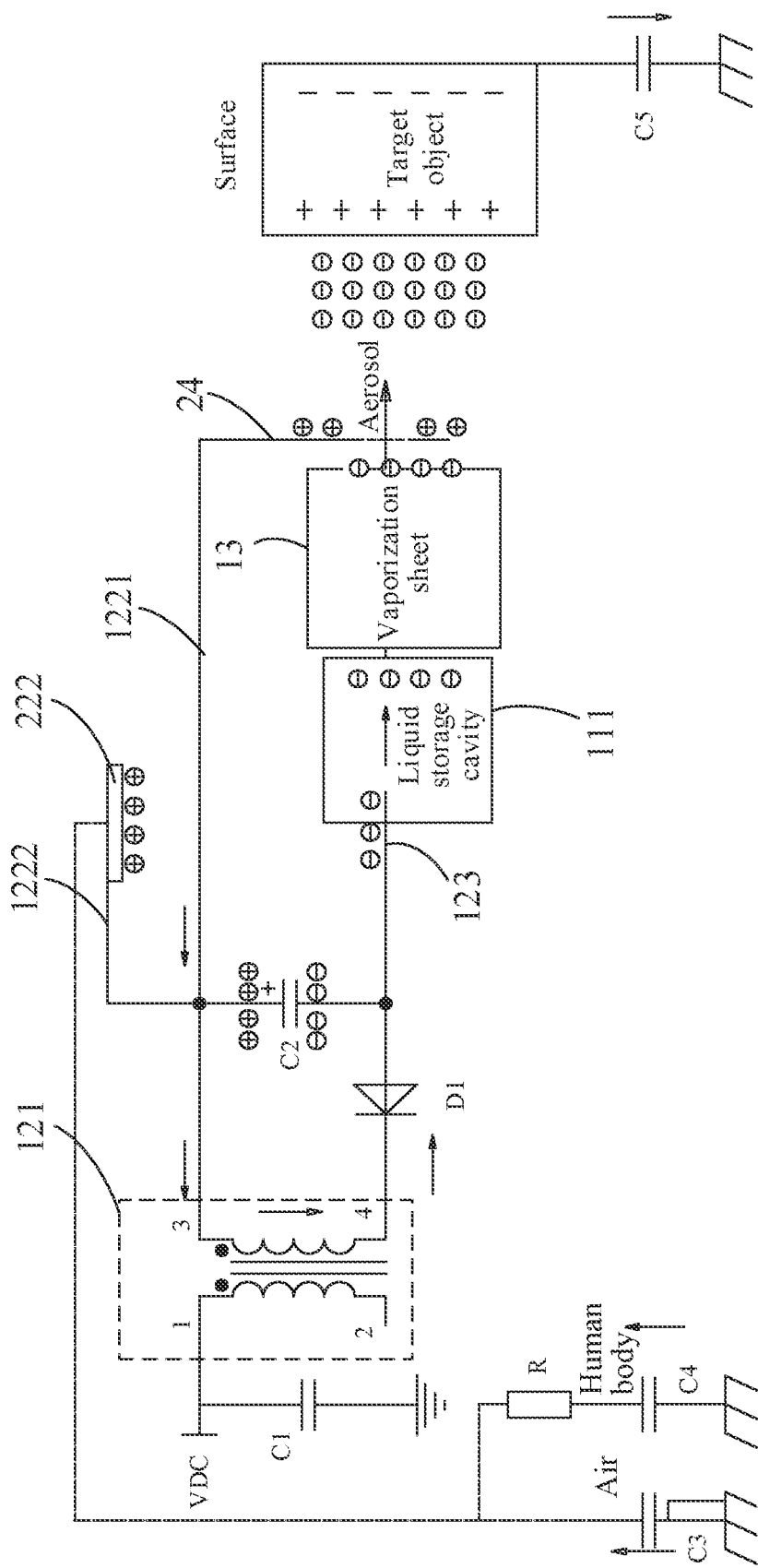

Referring to FIG. 8b together, FIG. 8b is a schematic diagram of a circuit of an aerosol-generating device corresponding to FIG. 8a. Different from the circuit structure in FIG. 5, the positive terminal 1221 of the static electricity generating assembly 12 is electrically connected to the metal element 24, and the positive terminal 1222 is electrically connected to the charge collector 222, so that the aerosol-generating substrate that is close to the vaporization sheet 13 induces a large quantity of negative charges.

In this embodiment, as shown in FIG. 8, the aerosol-generating device further includes a conductive protrusion 232. The conductive protrusion 232 is arranged on the inner surface of the accommodating cavity 112 and is electrically connected to the charge collector 222 that is arranged on the inner surface. The positive terminal 1222 is specifically electrically connected to the conductive protrusion 232, and is further electrically connected to the charge collector 222.

Specifically, the positive terminal 1222 can be fixed with the conductive protrusion 232 in a manner of winding.

Figure 9:
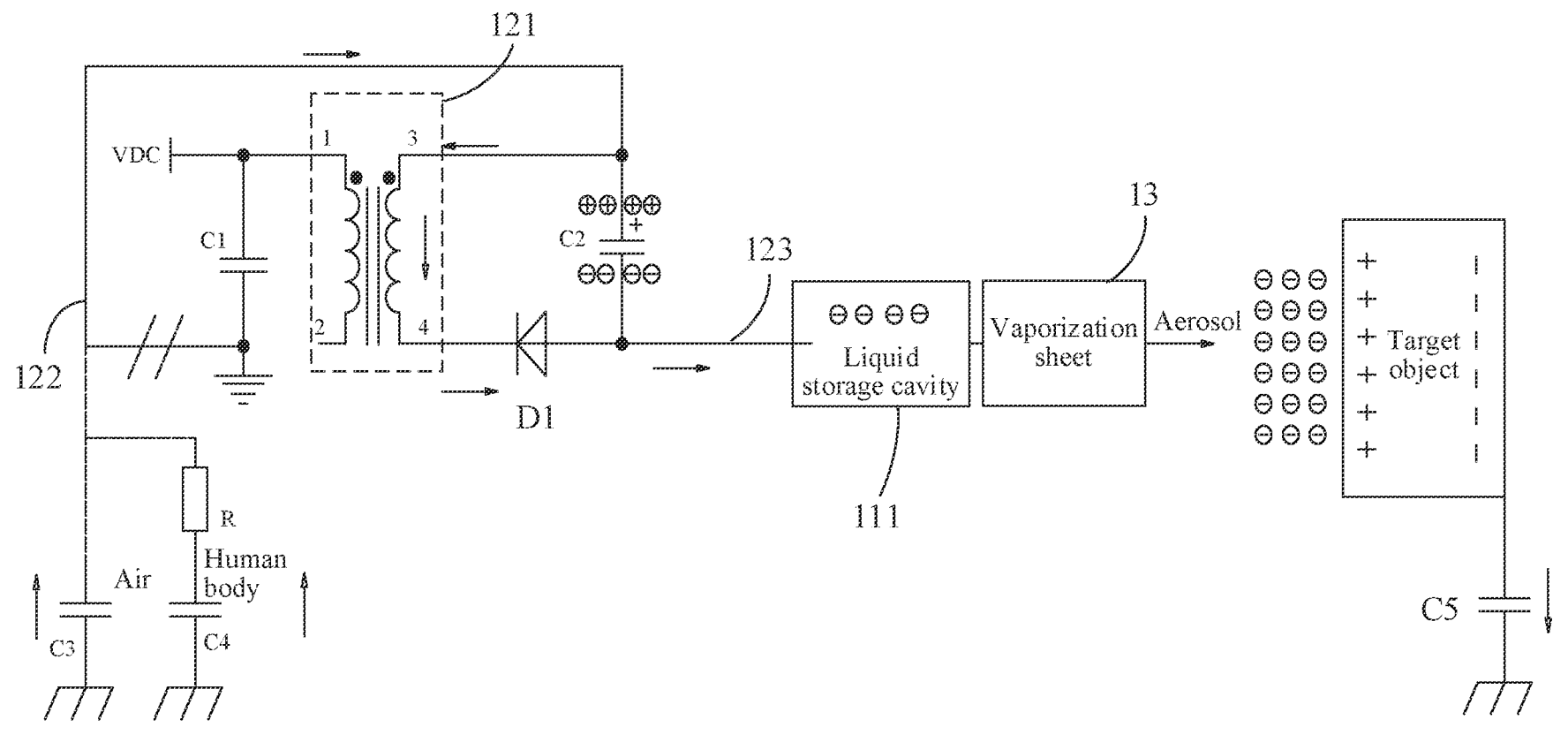

Certainly, the positive terminal 1222 can also be fixed with the conductive protrusion 232 by using fixing members such as a screw and a stud. Specifically, the conductive protrusion 232 can be in a columnar structure. In this embodiment, FIG. 9 is a schematic diagram of a circuit of an aerosol-generating device according to an embodiment of this application. Different from the circuit structure corresponding to FIG. 5, the positive terminal 122 of the static electricity generating assembly 12 is further connected to a primary side of the voltage converter 121 to implement connection between the primary side and the secondary side of the voltage converter 121, so that the surface area of the positive electrode is increased and it is convenient to obtain electrons. Specifically, the positive terminal 122 can be connected to the circuit board 141 that corresponds to the primary side to implement electrical connection with the primary side of the voltage converter 121. Specifically, the positive terminal 122 is connected to an end at which the first capacitor C1 is connected to the ground voltage. In this embodiment, the specific structure and function of the aerosol-generating device can be the same as or similar to the specific structure and function of the aerosol-generating device provided in any of the foregoing embodiments, and the same or similar technical effects can be achieved. Details are not repeated herein.

Figure 10:
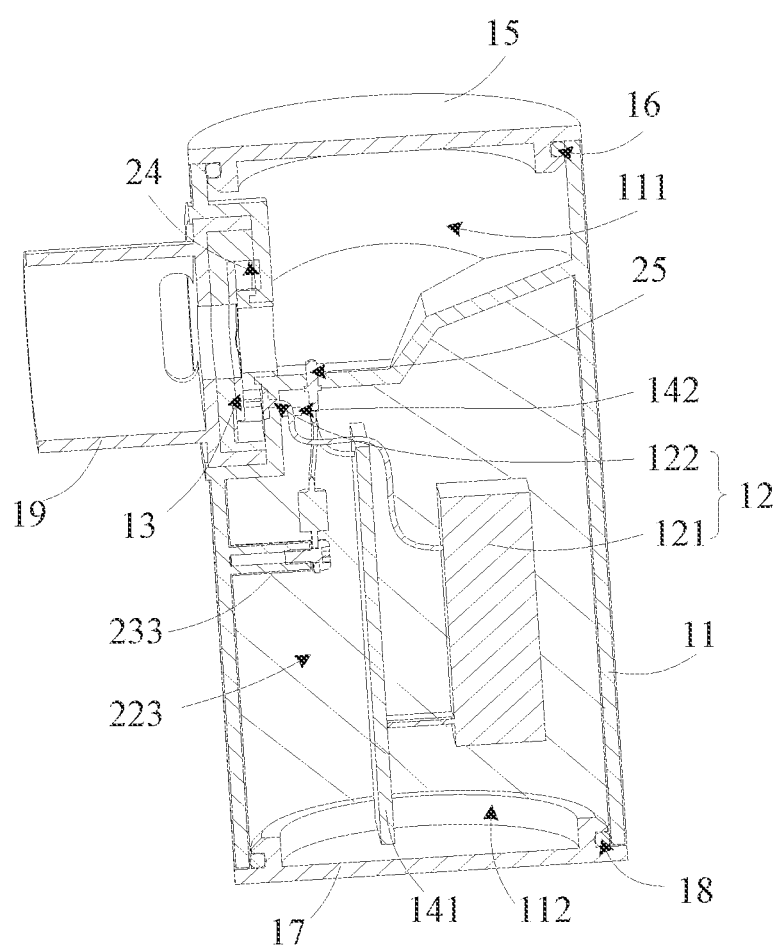
FIG. 10 is a cross-sectional view of the aerosol-generating device shown in FIG. 1 along an A-A direction according to a fourth embodiment.
Figure 11:
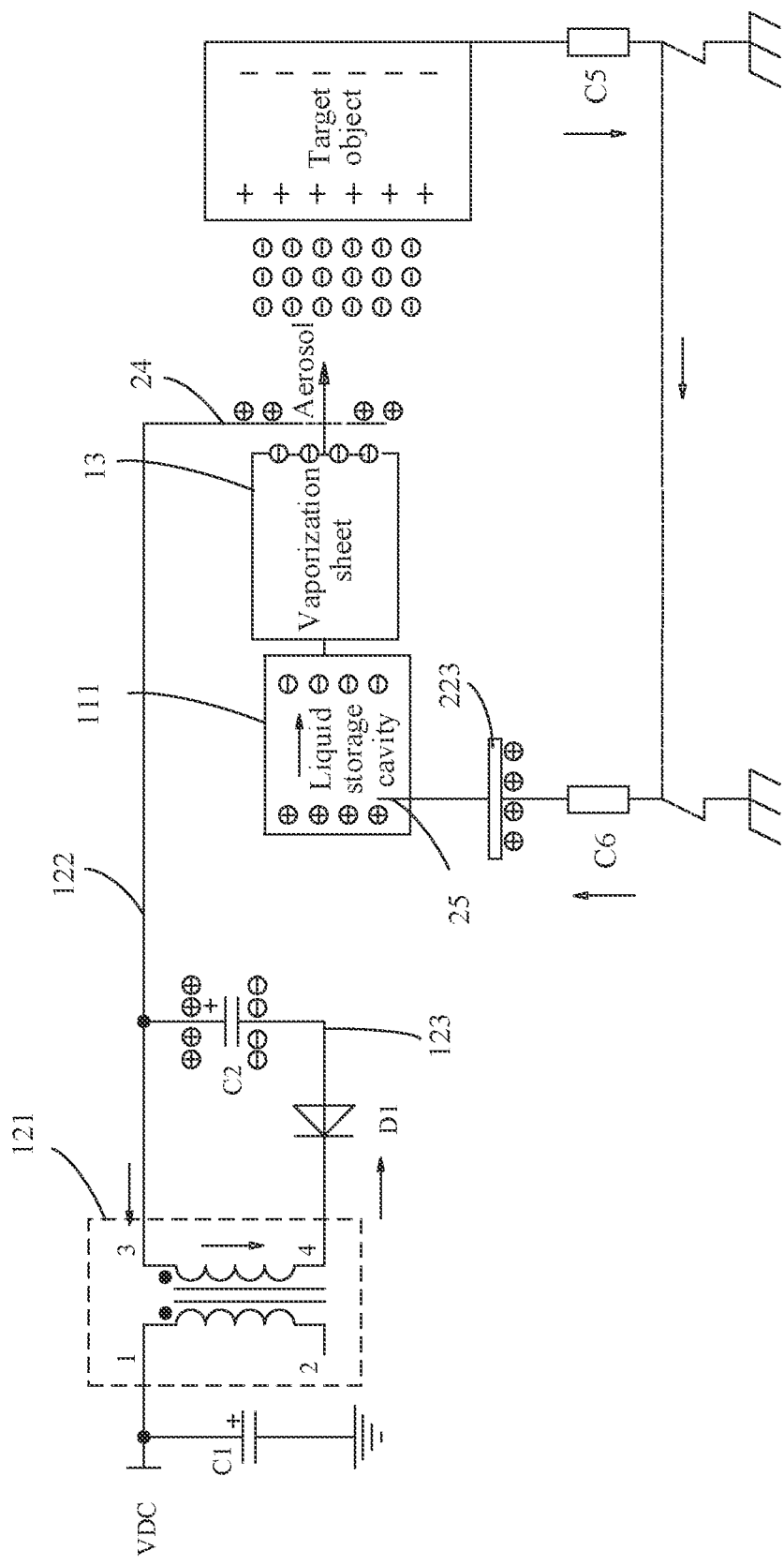
FIG. 11 is a schematic diagram of a circuit of an aerosol-generating device corresponding to FIG. 10.

In this embodiment, referring to FIG. 10 and FIG. 11, FIG. 10 is a cross-sectional view of an aerosol-generating device shown in FIG. 1 along an A-A direction according to a fourth embodiment; and FIG. 11 is a schematic diagram of a circuit of an aerosol-generating device corresponding to FIG. 10. The aerosol-generating device includes a housing 11, a metal element 24, and a static electricity generating assembly 12.

The housing 11 specifically includes an accommodating cavity 112. The static electricity generating assembly 12 is accommodated in the accommodating cavity 112, and the static electricity generating assembly 12 can specifically be a high-voltage static electricity generator. The static electricity generating assembly 12 includes a voltage converter 121 and a positive terminal 122 and a negative terminal 123 that are connected to the voltage converter 121.

The metal element 24 is arranged outside the liquid storage cavity 111 and is electrically connected to the positive terminal 122, to cause a part of the aerosol-generating substrate that is close to the metal element 24 to be charged by electromagnetic induction when the static electricity generating assembly 12 is electrified.

Specifically, the positive terminal 122 of the static electricity generating assembly is connected to the metal element 24 to cause the metal element 24 to be positively charged when the static electricity generating assembly 12 is electrified, so that the aerosol-generating substrate that is close to the metal element 24 induces a heterogeneous charge, that is, a negative charge, due to migration of electrons (identical charges repel each other, and heterogeneous charges attract each other), thereby charging the aerosol formed by vaporization. This is used as an example in the following embodiment. Certainly, in an alternative embodiment, the negative terminal 123 can also be connected to the metal element 24.

To cause the aerosol-generating substrate in the liquid storage cavity 111 to carry a negative charge, the aerosol-generating device includes a conductive terminal 25. The conductive terminal 25 includes a first end and a second end that are opposite to each other. The first end of the conductive terminal 25 extends into the liquid storage cavity 111 to come into contact with the aerosol-generating substrate in the liquid storage cavity 111. The second end of the conductive terminal 25 is exposed to the air to continuously transfer a large quantity of negative charges in the air into the aerosol-generating substrate in the liquid storage cavity 111 through the conductive terminal 25.

Further, as shown in FIG. 10, to increase the charge amount transferred from the conductive terminal 25 into the aerosol-generating substrate, the aerosol-generating device can further include a charge collector 223. The second end of the conductive terminal 25 can further be electrically connected to the charge collector 223 to increase a contact area with the air through the charge collector 223.

In this embodiment, the charge collector 223 can be arranged on an annular side wall of the accommodating cavity 112 that is different from the first cavity wall 112a, and the charge collector 223 can specifically be arranged on an inner surface of the annular side wall of the accommodating cavity 112 to receive more negative charges from the air. When the charge collector 223 is arranged on the inner surface of the accommodating cavity 112, more negative charges in the air can be accumulated by the charge collector 223 and transferred into the aerosol-generating substrate through the conductive terminal 25.

In this embodiment, as shown in FIG. 10, the aerosol-generating device further includes a conductive protrusion 233. The conductive protrusion 233 is arranged on the inner surface of the accommodating cavity 112 and is electrically connected to the charge collector 223 on the inner surface. The second end of the conductive terminal 25 is specifically electrically connected to the conductive protrusion 233, and is further electrically connected to the charge collector 223.

Further, the charge collector 223 can further be arranged on the outer surface of the housing 11, and the operator can directly touch the charge collector 223. In this case, the charge collector 223 can transfer the negative charges through the operator, thereby transferring the negative charges into the aerosol-generating substrate through the conductive terminal 25.

The specific structure and material of the charge collector 223 can be similar to the specific structure and material of the charge collector 221 and the charge collector 223 in the aerosol-generating device according to the second embodiment and the third embodiment, and reference can be made to the foregoing related description. Certainly, in this embodiment, at least a part of a side wall of the housing 11 is made of a conductive material, such as metal. The side wall of the housing 11 that is made of metal is also served as at least a part of the charge collector 223. In this embodiment, the conductive terminal 25 is specifically electrically connected to the housing 11 of the conductive material to reduce costs and simplify the manufacturing process.

Specifically, the entire housing 11 is made of metal, such as copper, aluminum, or a copper-aluminum alloy.

In this embodiment, as shown in FIG. 11, different from the circuit structure corresponding to FIG. 5, the negative terminal 123 of the static electricity generating assembly 12 is directly connected to the positive electrode of the diode D1, and is not in contact with the aerosol-generating substrate in the liquid storage cavity 111. The positive terminal 122 of the static electricity generating assembly 12 is connected to the metal element 24 to cause the aerosol-generating substrate in the liquid storage cavity 111 to be charged by electrostatic induction. In this embodiment, the negative charge can be passed through the air and/or the human body (corresponding to a virtual capacitor C6) from the ground to the charge collector 223, and then reaches the aerosol-generating substrate in the liquid storage cavity 111 through the charge collector 223 and the conductive terminal 25. Then the aerosol-generating substrate is vaporized by the vaporization sheet 13 and produces the aerosol, which reaches the target object and returns to the ground. The target object can be electrically connected to the ground through the air (corresponding to a virtual capacitor C5). Therefore, in the embodiment, a flow path of charges also forms a loop. When the housing 11 of the aerosol-generating device is provided with a charge collector 223, because the human body holds the charge collector 223 with one hand during use, the charges transferred to the human body by the aerosol can be cyclically used. As a result, static charges are not accumulated in the human body, which is highly safe.

It should be noted that, in this embodiment, other structures and functions of the housing 11, the static electricity generating assembly 12, and the metal element 24 are the same as or similar to structures and functions of the housing 11, the static electricity generating assembly 12, and the metal element 24 described in the foregoing three embodiments, the same or similar technical effects can be achieved, and reference can be made to the foregoing related text description.

Certainly, the aerosol-generating device provided in this embodiment further includes structures such as the vaporization sheet 13, the circuit board 141, the first cover body 15, the first sealing member 16, the second cover body 17, and the second sealing member 18 involved in the foregoing three embodiments. For the specific structures and functions of these structures, reference can be made to the related text descriptions in the foregoing embodiments and the related art, the same or similar technical effects can be achieved, and specific reference can be made to the foregoing related text descriptions.

This embodiment provides an aerosol-generating device. One of the positive terminal 122 and negative terminal 123 of the static electricity generating assembly 12 is connected to the metal element 24 to cause a part of the aerosol-generating substrate that is close to the metal element 24 in the liquid storage cavity 111 to be charged by electrostatic induction when the static electricity generating assembly 12 is electrified. In addition, a vaporization sheet 13, when electrified, vaporizes the charged aerosol-generating substrate to generate a charged aerosol. As a result, the charged aerosol particles can be effectively adsorbed on a surface of a target object by electrostatic adsorption, thereby greatly reducing rebounding and drifting of the aerosol on the surface of the target object, and greatly increasing the deposition rate of the aerosol particles on the surface of the target object.

The foregoing descriptions are merely implementations of this application, and the protection scope of this application is not limited thereto. All equivalent structure or process changes made according to the content of this specification and accompanying drawings in this application or by directly or indirectly applying this application in other related technical fields shall fall within the protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aerosol-generating device, comprising:
a housing comprising a liquid storage cavity configured to accommodate an aerosol-generating substrate;
a metal element arranged outside the liquid storage cavity;
a static electricity generating assembly comprising a positive terminal and a negative terminal, one of the positive terminal and the negative terminal being electrically connected to the metal element so as to cause a part of the aerosol-generating substrate that is close to the metal element in the liquid storage cavity to be charged by electrostatic induction when the static electricity generating assembly is electrified;
a vaporization sheet, that, when electrified, is configured to vaporize the charged aerosol-generating substrate to generate a charged aerosol; and
a conductive terminal, wherein a first end of the conductive terminal extends into the liquid storage cavity,
wherein a second end of the conductive terminal that is opposite the first end does not extend into the liquid storage cavity,
wherein the liquid storage cavity comprises a liquid outlet, and
wherein the metal element is arranged so as to surround the liquid outlet and is located between the vaporization sheet and the liquid storage cavity.

2. The aerosol-generating device of claim 1, wherein the positive terminal is electrically connected to the metal element.

3. The aerosol-generating device of claim 1, further comprising:
a charge collector insulated from the metal element,
wherein the second end of the conductive terminal is electrically connected to the charge collector.

4. The aerosol-generating device of claim 3, wherein the housing further comprises an accommodating cavity, and
wherein the charge collector comprises a metal layer that is arranged on an inner surface of the accommodating cavity or a metal part that is fixed on the inner surface of the accommodating cavity.

5. The aerosol-generating device of claim 4, further comprising:
a conductive protrusion arranged on the inner surface of the accommodating cavity and electrically connected to the charge collector,
wherein the conductive terminal is electrically connected to the conductive protrusion.

6. The aerosol-generating device of claim 3, wherein at least a part of a side wall of the housing comprises metal, and
wherein the side wall of the housing that comprises metal comprises at least a part of the charge collector.

7. The aerosol-generating device of claim 1, wherein the static electricity generating assembly further comprises a voltage converter comprising a primary side and a secondary side, the positive terminal being electrically connected to the primary side, the negative terminal being electrically connected to the secondary side, and
wherein the primary side is electrically connected to or insulated from the secondary side.

8. An aerosol-generating device, comprising:
a housing comprising a liquid storage cavity configured to accommodate an aerosol-generating substrate;
a metal element arranged outside the liquid storage cavity;
a static electricity generating assembly comprising a positive terminal and a negative terminal, one of the positive terminal and the negative terminal being electrically connected to the metal element so as to cause a part of the aerosol-generating substrate that is close to the metal element in the liquid storage cavity to be charged by electrostatic induction when the static electricity generating assembly is electrified;
a vaporization sheet, that, when electrified, is configured to vaporize the charged aerosol-generating substrate to generate a charged aerosol; and
a conductive terminal,
wherein a first end of the conductive terminal extends into the liquid storage cavity,
wherein a second end of the conductive terminal that is opposite the first end does not extend into the liquid storage cavity,
wherein the liquid storage cavity comprises a liquid outlet,
wherein the metal element is arranged so as to surround the liquid outlet and is located between the vaporization sheet and the liquid storage cavity, and
wherein the metal element comprises a closed ring arranged in a circumferential direction of the liquid outlet.

* * * * *